(12) United States Patent
Parachini et al.

(10) Patent No.: US 10,701,766 B2
(45) Date of Patent: Jun. 30, 2020

(54) VERSATILE INDUCTION HOB

(71) Applicant: WHIRLPOOL CORPORATION, Benton Harbor, MI (US)

(72) Inventors: Davide Parachini, Comerio (IT); Cristiano Pastore, Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 295 days.

(21) Appl. No.: 15/726,823

(22) Filed: Oct. 6, 2017

(65) Prior Publication Data

US 2018/0103510 A1    Apr. 12, 2018

(30) Foreign Application Priority Data

Oct. 6, 2016 (EP) .................................. 161927090

(51) Int. Cl.
*H05B 6/12* (2006.01)
*H05B 6/06* (2006.01)
*H05B 6/04* (2006.01)
*A47J 36/24* (2006.01)

(52) U.S. Cl.
CPC .......... *H05B 6/062* (2013.01); *H05B 6/1272* (2013.01); *A47J 36/2483* (2013.01); *H05B 6/12* (2013.01)

(58) Field of Classification Search
CPC . H05B 6/04; H05B 6/06; H05B 6/062; H05B 6/065; H05B 6/08; H05B 6/12; H05B 6/1209; H05B 6/1236; H05B 6/1272; H05B 6/362; A47J 36/2483
USPC .... 219/462.1, 620, 622, 624, 625, 660–668, 219/670–672, 675
See application file for complete search history.

(56) References Cited

U.S. PATENT DOCUMENTS

| | | | | |
|---|---|---|---|---|
| 2012/0205365 A1* | 8/2012 | Anton Falcon | ........ | H05B 6/065 |
| | | | | 219/620 |
| 2012/0318786 A1* | 12/2012 | Casanova Lacueva | ..................... | |
| | | | | H05B 6/062 |
| | | | | 219/626 |
| 2013/0087554 A1* | 4/2013 | Anton Falcon | ........ | H05B 6/062 |
| | | | | 219/622 |
| 2016/0323937 A1* | 11/2016 | Anton Falcon | ........ | H05B 6/062 |
| 2017/0079092 A1* | 3/2017 | Anton Falcon | ........ | H05B 6/065 |

FOREIGN PATENT DOCUMENTS

| DE | 102012220324 A1 | 6/2013 |
|----|-----------------|--------|
| EP | 0724379 A1      | 7/1996 |
| EP | 0926926 A1      | 6/1999 |

OTHER PUBLICATIONS

European Search Report for Counterpart EP16192709.0, dated Apr. 10, 2017.

\* cited by examiner

*Primary Examiner* — Hung D Nguyen
(74) *Attorney, Agent, or Firm* — McGarry Bair PC

(57) ABSTRACT

Induction hob provided with a frequency converter and parallel branches, departing from the output of the converter. Each branch includes a switch and an inductor. The hob also comprises a configurable contact to enable an electrical connection of a first intermediate terminal between the first inductor and the first switch in the first branch (A) and a second intermediate terminal between the second inductor and the second switch in the second branch. The hob, depending on the configuration of the switches, can operate each of the two inductors alone, or in parallel connection, or in series connection.

9 Claims, 3 Drawing Sheets

VERSATILE INDUCTION HOB

CROSS REFERENCE TO RELATED APPLICATIONS

This application claims priority to European Patent Application No. 16192709.0 filed Oct. 6, 2016, which is hereby incorporated by reference in its entirety.

BACKGROUND OF THE DISCLOSURE

The present invention concerns an induction hob provided with an internal configurable topology.

Nowadays an increased variety of cooking containers is present on the market. These containers present different not-standard shapes and sometimes offer new specific functionalities for which customized heating methods are required.

It is therefore now expected to have cooking hobs which can efficiently heat these containers, and possibly to heat an undefined number of said containers randomly placed on the cooking hob surface.

BRIEF DESCRIPTION

One embodiment of the present disclosure is an induction hob comprising a frequency converter and a first branch departing from an output of the frequency converter. The first branch includes a first switch in series with a first inductor. The first branch ends with a first end terminal. The first end terminal is in electric contact with at least a first capacitive element as to form a first resonant circuit. The hob also has a second branch departing from the output of the frequency converter. The second branch includes, in a reverse order compared to the first branch, a second inductor in series with a second switch. The second branch ends with a second end terminal. The second end terminal is in electrical contact with at least a second capacitive element as to form a second resonant circuit. The hob also comprises a first configurable contact to enable an electrical connection of a first intermediate terminal between the first inductor and the first switch in the first branch and a second intermediate terminal between the second inductor and the second switch in the second branch. The hob is configured to operate, in conjunction with the configuration of the first switch and of the second switch, with the first inductor alone or with the second inductor alone, or with the first inductor and the second inductor in a series connection, or with the first inductor and the second inductor in a parallel connection.

DRAWINGS

Other features and advantages of the present invention will become readily apparent to the skilled artisan from the following detailed description when read in light of the accompanying drawings, in which.

DETAILED DESCRIPTION

It is a purpose of the present invention to obtain an induction hob which efficiently adapts its configuration (topology) according to the different constructional or heating requirements, without the need of using different types of converters.

It is also a purpose of the present invention to provide an induction hob which can be produced in large volume, which addresses the problem of supplying multiple induction coils with the same high frequency converter and which can supply and control many variants of coils with completely different impedances and arranged in a topology which can be configured according to the hob heating requirements and/or construction hob requirements.

Modern cooking hobs based on the induction technology, known as flexible induction hob, can offer a solution to the above problems. Flexible induction hobs are typically provided with a plurality of induction coils (compared to traditional induction hobs with four burners) whose dimensions are typically smaller than the size of the cooking vessel. These coils are normally distributed one next to the other under the cooking surface, forming mono-dimensional or bi-dimensional arrays. An obvious request for a flexible induction hob is therefore to efficiently supply, in a controlled manner, a plurality of induction coils for heating a plurality of cooking containers (typically, up to 5 cooking containers in standard built household appliances) randomly distributed on the cooking surface.

To reach this target, known hobs are configured to have a number of frequency converter devices corresponding to the number of coils to be supplied. This solution is complex and expensive.

In other known flexible induction hobs a reduced number of frequency converters can be associated to the plurality of induction coils, in a multiplexed manner, through the mechanical switches (relays) or through solid state switches (IGBTs, TRIACs SCRs etc). However, only a limited number of specific configurations can be successfully operated through said multiplexed structure, while for the other configurations it fails to work because a sufficient level of independency in activating the coils in a grouped manner is not achieved, or because they result in heating the superposed cooking container in an inefficient manner, as described in the following.

Figure 1:
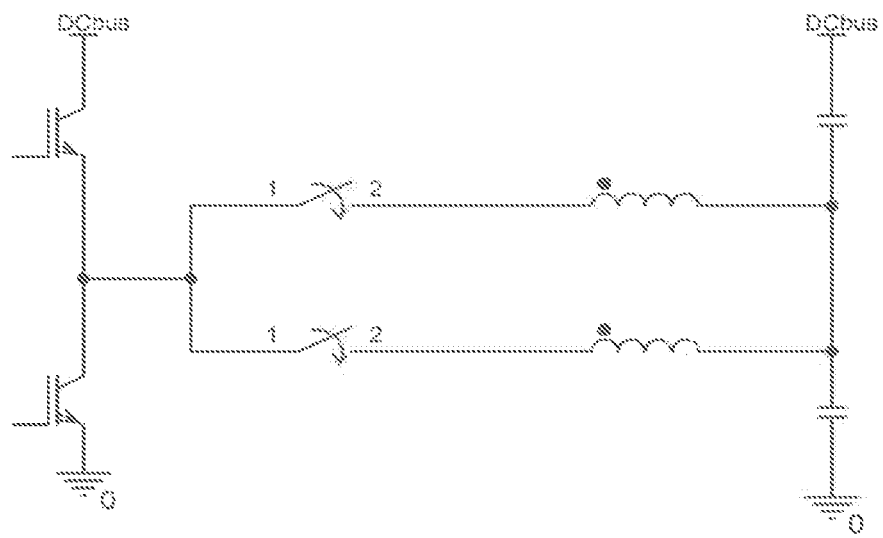
FIG. 1 shows a configuration of an induction hob known in the art in which inductors are connected in parallel and supplied by a same frequency converter.

EP-A-0724379 discloses an induction hob in which a single frequency converter is connected to a plurality of induction coils connected in parallel branches (as represented in FIG. 1 for the simplest case of just two coils), through a plurality of relays connected to the output of the converter. The main drawback of this solution stands in that when two or more coils are supplied in parallel, the equivalent load that the frequency converter "sees", as resulting from the parallel of the plurality of coils, is a very low impedance value compared to the impedance of a single coil, even in the simplest case in which just two coils are connected. This solution results in an inefficient power delivery.

Moreover, when two or more identical coils are connected in parallel, the resonant frequency tends to increase (of a factor which is proportional to the square root of the number of connected coils), which could lead to an unacceptable "high" operating frequency (outside the typical induction frequency range of 20-50 kHz).

Further, when only one of the two identical coils fed in parallel is partially covered by the superposed cooking container, a large magnetic flux leakage occurs. As a consequence, when both inductors are supplied in parallel, the inductance of the coil partially covered increases, compared to the other one, whilst its ohmic resistance decreases. This has the effect that the partially covered inductor absorbs a larger amount of current compared to the fully covered inductor, in particular when supplied with a frequency close to resonance.

On the other hand, the current absorbed when one of the two parallel inductors is partially covered is smaller when the coils are driven with a frequency sufficiently far from the resonance frequency.

Therefore in induction hobs having the coils disposed below the same cooking utensils and supplied in parallel by the same converter, a partial coverage of one of the coils causes an unbalanced power distribution (density) among the coils heating the cooking utensil. In addition, the power density unbalance changes with the converter operating frequency, making an even heating more difficult to be actuated.

Figure 2:
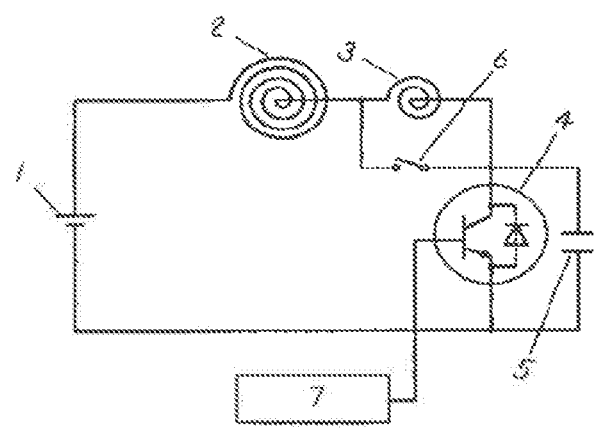
FIG. 2 shows a configuration of an induction hob known in the art in which inductors are connected in series and supplied by a same frequency converter.

It is also known that if increased powers are needed for the individual coils, the wire gauge need to be increased. However a physical limitation occurs whenever the required number of coil turns composing the inductor cannot be accommodated in the available given hob area. A solutions to this problem known in the art (as represented in FIG. 2) is, for instance an induction hob in which induction coils, preferably identical, can be connected in series. In this configuration each inductor is supplied with a fraction (half in the case of two identical inductors) of the effective supply voltage. Therefore, for delivering the same (maximum) power level, each single inductor of the series connection requires a reduced number of wire turns, approximately of a factor proportional to the square root of two ($\sqrt{2}$), compared to the single coil. In this way more compact coil construction is achieved, which results in an easier and compact accommodation of the inductors in the restricted area underneath the hob cooking surface.

As in the previous case of paralleled inductors, the resonant frequency also changes whenever a plurality of induction coils are connected in series. However, two induction coils connected in series entail larger impedance compared to a single coil, thus resulting in a lower operating frequency and consequently in reduced commutation losses. This effect is beneficial to compensate the higher conduction losses associated with the maximum power level output. Furthermore with respect to the parallel connection, when one of the two coils is only partially covered by a pot, the power density is preserved, since it depends on the coil current, which in case of series connection is inherently the same among the two coils.

Figure 3:
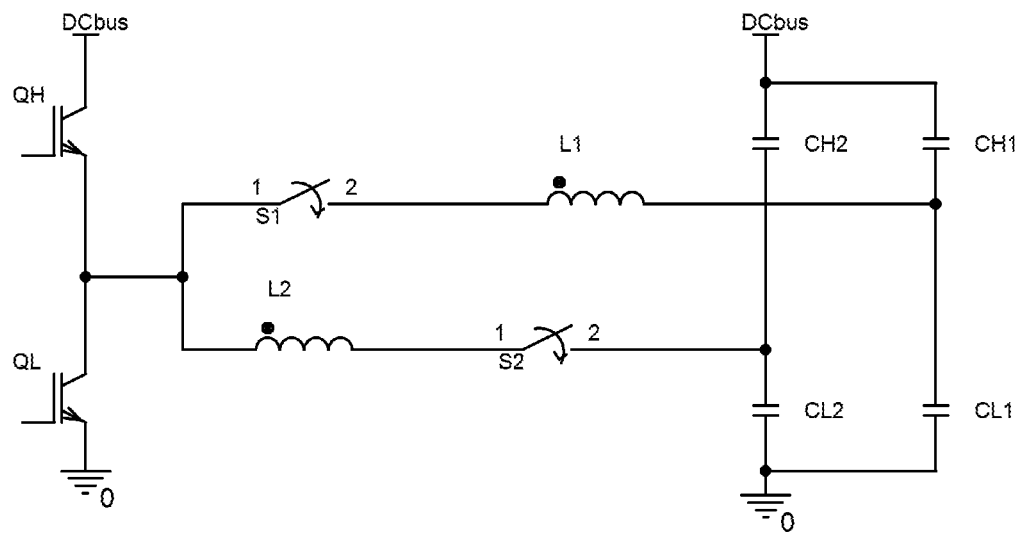
FIG. 3 shows a configuration of an induction hob known in the art in which inductors are arranged in parallel branches and connected to independent and dedicated resonant capacitors.

In other known solutions, as for instance in the one disclosed by EP-A-926926, induction coils (inductors) are connected in parallel branches to independent, dedicated and independent resonant capacitor(s), as depicted in FIG. 3. This particular topology has the advantage that each individual coil resonates with the dedicated resonant capacitor or set of resonant capacitors, in a way that each individual resonant frequency is not affected by the operational state of neighboring coils.

On the other hand, in the parallel configuration of FIG. 3, when only one coil is requested to be operated at very high power (e.g. the maximum power level, i.e. when the value of current circulating in the resonant circuit is close to the maximum admissible design value), all the current need to be beared by one set of resonant capacitors, whereas in the configuration of FIG. 1 the same current would had been shared among two set of resonant capacitors, thus leading to higher capacitor overheating and shorter service life.

As a result, none of the above known induction hob configurations is preferable over the other in all the circumstances for efficiently heating more than two cooking containers randomly placed on the cooking surface, especially if they need to be supplied simultaneously at different power levels.

Figure 4:
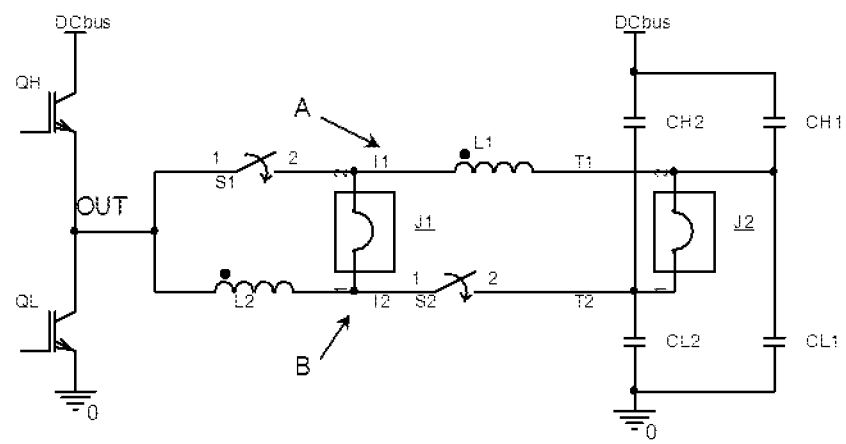
FIG. 4 shows a schematic representation of a preferred induction hob according to the present invention.

With reference to FIG. 4 it is here disclosed a non limitative example of an induction hob according to the present invention which is configurable for the purposes of creating a specific product model or for the efficient heating of cooking utensils (for instance cooking containers or coffee machine) randomly placed on the cooking surface of the hob. According to the present invention the hob comprises a frequency converter FC comprising a Direct Current source $DC_{bus}$. Such converter FC is preferably an half bridge converter provided with two solid state switches QH and QL but it can be of any other type of suitable converters, including single-end converters. Two parallel branches, each of which containing an induction coil in series with a switch depart from the output OUT of the converter FC. In particular, a first branch A departing from the output OUT of the frequency converter FC includes a first switch S1 and a first inductor L1 connected in series. The first branch A ends at first end terminal T1 which is in electric contact with a first capacitive element CH1, CL1 forming resonant capacitor C1, which in turn forms a first resonant circuit RS1 with the first inductor L1. In a similar manner, a second branch B departs from the output OUT of the frequency converter FC and includes, in a reverse order of the first branch A, a second inductor L2 in series connection with a second switch S2. The second branch B ends with a second end terminal T2 which is in electrical contact with a second capacitive element CH2, CL2, forming resonant capacitor C2, which in turn forms a second resonant circuit RS2 with the second inductor L2.

Preferably, the first capacitive element C1 is made of two capacitors departing from the first end terminal T1: a first capacitor CH1 connected between the first end terminal T1 and the direct current source $DC_{bus}$, and a second capacitor CL1 connected between the first end terminal T1 and a reference voltage (GND) in common with the frequency converter FC, preferably an half bridge converter FC. In a similar manner, the second capacitive element C2 is preferably made of two capacitors departing from the second end terminal T2: a third capacitor CH2 connected between the second end terminal T2 and the Direct Current source $DC_{bus}$, and a fourth capacitor CL2 connected between the second end terminal T2 and to the reference voltage GND in common with the half bridge converter FC.

However, in alternative (not depicted) embodiments, according to the type of frequency converter FC and according to the convenience of the heating performances to be satisfied, each of the capacitive elements C1 and C2 can be formed by one or more capacitors CHi, CLi.

According to the present invention the hob comprises first configuring contact means J1 to electrically bridge (i.e. connect) intermediate terminals I1 and I2 between the induction coil L1 or L2 and the respective switch S1 or S2 of each of the two branches A and B. The combination of switches and the first configuring contact means J1 allow the parallel or the series configuration of the two induction coils L1 and L2. As a result, in a particular condition, a more convenient solution would be to arrange in parallel the coils supplied by the single high frequency converter, as depicted in FIG. 1. In another condition a different convenient solution would be to arrange in series the coils supplied by the single high frequency converter, as depicted in FIG. 2.

Figure 7:
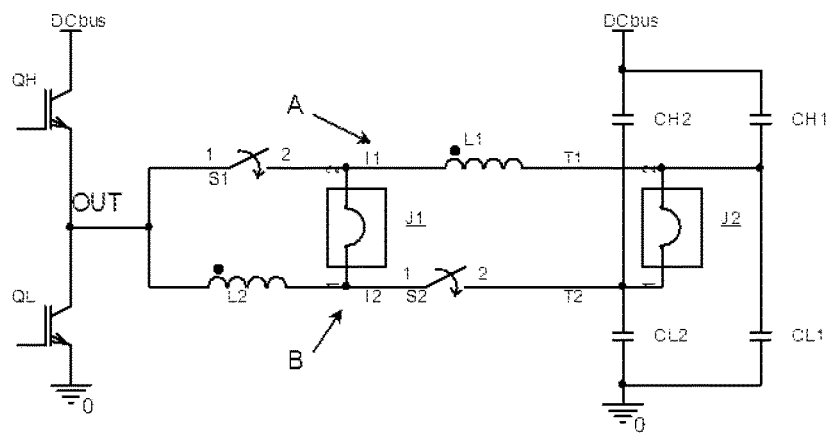
FIG. 7 shows a configuration of the hob of the present invention according to Topology 3.

With reference to configuration shown in FIG. 7, which corresponds to the further described Topology 3, whenever just one inductor is to be supplied by the single frequency converter FC, it is sufficient to close the relay shunting the other inductor, in order to short-circuit it.

In a further aspect of the invention, the hob comprises a second configuring contact means J2 to electrically bridge said first end terminal T1 and second end terminal T2. The additional presence of the second contact means J2 allow the inductors L1 and L2 alone, or in combination (i.e. in series or in parallel connection), to resonate with separate capacitive elements C1 and C2 (for instance, L1 resonating with CL1 in parallel with CH1 and L2 resonating with CL2 in parallel with CH2) or to resonate with the capacitive elements C1 and C2 connected in parallel (for instance, CL1 CL2, CH1 and CH2 connected in parallel). This has the effect of changing the resonating capacity of the configured hob, for counter balancing any undesired unbalanced power delivery, whenever it occurs.

According to the invention, any configuring contact means can be static and obtained by pins joinable with static metallic conductors, which can or cannot be mounted in the factory according to the particular topology to be produced. As an alternative, configuring contact means can also be electric bridges obtained with metallic conductors on control boards of the hob which are suitable to be selectively removed by manual or automatic operation (e.g. interrupted by means of scissors or the like) according to the particular topology to be produced. As a further alternative, configuring contact means can also be in the form of electric switches mounted on the hob control board, to be selectively configured in the appropriate position, according to the particular topology to be produced. Static contact means achieve configuring the control board according into one of the possible configurations/topologies of the hob.

However, configuring contact means can also be embodied by controlled switches, for instance mechanical switches (e.g. relays) or solid state switches, thanks to which the induction hob can be freely reconfigurable at any time by software, particularly during heating operations.

With reference to the hob described in the embodiment of FIG. 4, the following hob topologies can be obtained.

Figure 5:
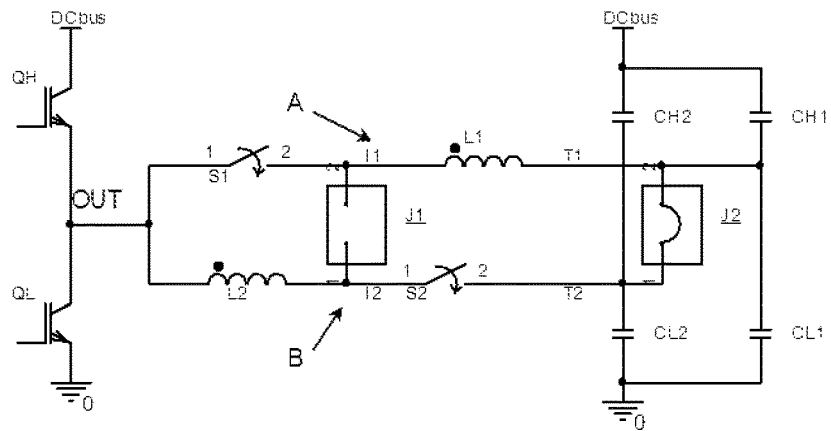
FIG. 5 shows a configuration of the hob of the present invention according to Topology 1.

Topology 1 (represented in FIG. 5): J1 open, J2 Closed. This configures an hob having two inductors L1 and L2 connected in parallel with common resonant capacitors (CL1,CL2, CH1 and CH2 in equivalent parallel, i.e. sharing the same current). In particular, Topology 1 can be further configured in the following 3 sub-cases:

S1 closed, S2 open: L2 unpowered, L1 supplied and resonating with capacitors CL1, CL2, CH1 and CH2 in equivalent parallel connection;

S1 open, S2 closed: L1 unpowered, L2 supplied and resonating with capacitors CL1, CL2, CH1 and CH2 in equivalent parallel connection;

S1 closed, S2 closed: L1 and L2 supplied in parallel and resonating with capacitors CL1, CL2, CH1 and CH2 connected in equivalent parallel.

Figure 6:
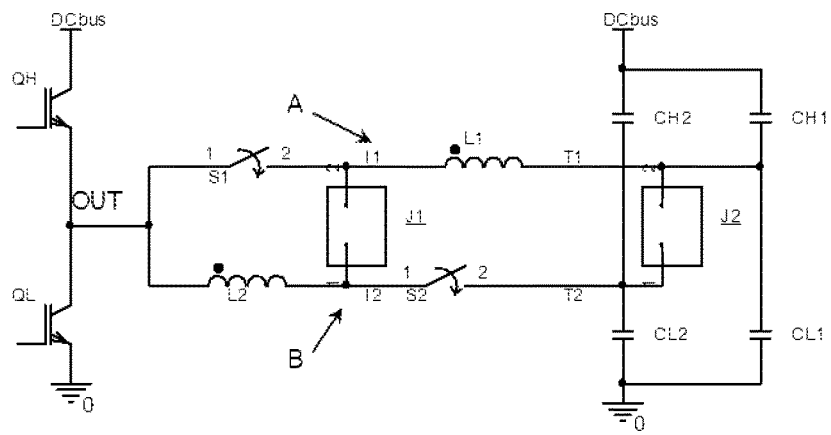
FIG. 6 shows a configuration of the hob of the present invention according to Topology 2.

Topology 2 (represented in FIG. 6): J1 open, J2 Open. This configures a hob having two inductors L1 and L2 wherein each inductor resonates with a pair of independent resonant capacitors in parallel. Topology 2 can be further configured in the following 3 sub-cases:

S1 closed, S2 open: L2 unpowered, L1 supplied and resonating with CL1 and CH1 in parallel;

S1 open, S2 closed: L1 unpowered, L2 supplied and resonating with CL2 and CH2 in parallel;

S1 closed, S2 closed: L1 and L2 supplied. L1 resonating with the parallel of capacitors CL1 and CH1. L2 resonating with the parallel of capacitors CL2 and CH2.

S1 open, S2 open: Both L1 and L2 unpowered. The same state can be obtained in any of the previous sub-cases by halting the converter.

Topology 3 (represented in FIG. 7): J1 closed, J2 Closed. This configures an hob having two inductors L1 and L2 connected in series connection with shorting relays. Topology 3 can be further configured in the following in 3 sub-cases:

S1 closed, S2 open: L2 unpowered, L1 supplied and resonating with resonating with capacitors CL1, CL2, CH1 and CH2 connected in equivalent parallel.

S1 open, S2 closed: L1 unpowered, L2 supplied and resonating with capacitors CL1, CL2, CH1 and CH2 connected in equivalent parallel.

S1 open, S2 open: L1 and L2 supplied in series. The series of L1 and L2 resonating with the capacitors CL1, CL2, CH1 and CH2 in equivalent parallel The configuration with S1 closed and S2 closed must be avoided as it would damage the converter by loading it with a purely capacitive load.

Topology 3 is particularly advantageous when applied to contiguous, not concentric, coils forming a flexible zone, because being the coils driven with the same current, their power density is equal, so even if a pot is only partially covering one coil, the power delivered by such coil will be almost proportional to the pot coverage of the coil.

According to the present invention, a new and advantageous heating method can be establishes on said versatile hob when a cooking utensil, for instance a pot, is placed on the cooking surface for being heated by underneath coils L1 and L2.

According to this method, the hob can be dynamically configured during the heating process, to heat the cooking utensil using two coils L1, L2 supplied by the same frequency converter FC alternatively connected in a parallel and/or in a series connection. This will allow achieving the best compromise in term of efficient heating and power (balance) distribution.

Even though the aforementioned example has been described for the case of two inductors fed by one converter, it is clear and understood that the man skilled in the art can easily extend the above teaching to configurations including three, four or any other number of inductors.

According to the a preferred aspect of the present invention, the hob comprises a plurality of static or controlled second configuring contact means in order to configure the resonating frequency for the series or parallel coils driven by the same frequency converter FC, preferably in order the maintain the resonance frequency of the configured hob in a narrow band of frequency, for instance within 5 KHz.

In a further aspect of the invention the hob further comprises configurable switchover means, preferably in the form of controlled switches, for connecting additional capacitive elements so as to modify the resonant circuit. Preferably, additional capacitive elements are in the form of one or more capacitors, to the resonant circuit in addition or in alternation. The presence of additionally configurable capacitive elements will allow an improved balanced behavior of the hob when the frequency converter supplies the several possible configurations of the induction coils.

Regardless of the Topology being implemented, the transition among the sub-cases must be preferably performed with zero current (ZCS), which is a condition obtained after halting the converter and waiting a time larger than 3 times the time constant of the damping oscillation of the resonating circuit.

In a further aspect of the invention two of the coils of the hob L1 and L2 are placed on two opposite faces of the same support, overlapped one to the other, in order to be associated with the same heating area of the cooking hob surface. Preferably the geometry of the two coils is the same but is displaced around a same symmetry axis.

When a cooking utensil, for instance a pot or a coffee machine, is placed on a cooking surface for being heated by underneath coils L1 and L2, the hob can be configured to heat the cooking utensil with the coils in a parallel or in a series connection, or with a heating sequence in which the coils are connected in parallel connection and in series connection, in order to achieve the best compromise in term of efficient heating and power (balance) distribution.

Even though specific embodiments have been disclosed in the above description, their combination is allowable and stays within the scope of the present invention.

It has been therefore described an advantageous induction hob provided a versatile topology which allows at least the implementation of all the known topologies on a same Printed Circuit Board assembly, which allow improved heating methods.

The invention claimed is:

1. An induction hob comprising a frequency converter and:
   a first branch departing from an output of the frequency converter and which includes a first switch in series with a first inductor, said first branch ending with a first end terminal, the first end terminal being in electric contact with at least a first capacitive element as to form a first resonant circuit,
   a second branch departing from the output of the frequency converter and which includes in a reverse order compared to the first branch a second inductor in series with a second switch, said second branch ending with a second end terminal, the second end terminal being in electrical contact with at least a second capacitive element as to form a second resonant circuit,
   wherein the induction hob comprises a first configurable contact to enable an electrical connection of a first intermediate terminal between the first inductor and the first switch in the first branch and a second intermediate terminal between the second inductor and the second switch in the second branch, so that the induction hob is configured to operate, in conjunction with the configuration of the first switch and of the second switch, with the first inductor alone or with the second inductor alone, or with the first inductor and the second inductor in a series connection, or with the first inductor and the second inductor in a parallel connection.

2. The induction hob according to claim 1 wherein the first configurable contact comprises removable contacts.

3. The induction hob according to claim 1 wherein the first configurable contact comprises switches or controllable switches.

4. The induction hob according to claim 3 wherein the switches or controllable switches are one of a relay or solid state switch.

5. The induction hob according to claim 1 wherein the induction hob further comprises a second configurable contact configured to enable an electrical connection of the first end terminal with the second end terminal.

6. The induction hob according to claim 5 wherein the second configurable contact comprises removable contacts.

7. The induction hob according to claim 5 wherein the second configurable contact comprises switches or controllable switches.

8. The induction hob according to claim 7 wherein the switches or controllable switches are one of a relay or solid state switch.

9. The induction hob according to claim 5 wherein the frequency converter is a half bridge converter and the first capacitive element comprises a first upper capacitor connected between the first end terminal and a direct current source of the frequency converter, and a first lower capacitor connected between the first end terminal and a reference voltage in common with the frequency converter, and wherein the second capacitive element comprises a second upper capacitor connected between the second end terminal and the direct current source and a second lower capacitor connected between the second end terminal and to the reference voltage in common with the frequency converter.

* * * * *